US012500365B2

(12) United States Patent
Ikeda et al.

(10) Patent No.: US 12,500,365 B2
(45) Date of Patent: Dec. 16, 2025

(54) CONNECTOR-EQUIPPED WIRE AND CONNECTOR HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yoshitaka Ikeda, Mie (JP); Kosuke Sone, Mie (JP); Tomoyuki Kondo, Mie (JP); Naomichi Kawashima, Mie (JP); Yutaro Yoshida, Mie (JP)

(73) Assignees: AUTONETWORKS TECHNOLOGIES, LTD, Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 509 days.

(21) Appl. No.: 17/920,593

(22) PCT Filed: Apr. 5, 2021

(86) PCT No.: PCT/JP2021/014464

§ 371 (c)(1),
(2) Date: Oct. 21, 2022

(87) PCT Pub. No.: WO2021/220725

PCT Pub. Date: Nov. 4, 2021

(65) Prior Publication Data

US 2023/0163509 A1 May 25, 2023

(30) Foreign Application Priority Data

Apr. 27, 2020 (JP) ................................ 2020-078196

(51) Int. Cl.

| | |
|---|---|
| ***H01R 13/42*** | (2006.01) |
| ***H01B 7/18*** | (2006.01) |
| ***H01R 11/11*** | (2006.01) |
| ***H01R 13/516*** | (2006.01) |
| ***H01R 13/52*** | (2006.01) |
| *H01R 4/18* | (2006.01) |

(52) U.S. Cl.

CPC ............... *H01R 13/42* (2013.01); *H01B 7/18* (2013.01); *H01R 11/11* (2013.01); *H01R 13/516* (2013.01); *H01R 13/5219* (2013.01); *H01R 4/184* (2013.01)

(58) Field of Classification Search

CPC ........................................................ H01B 7/18

(Continued)

(56) References Cited

U.S. PATENT DOCUMENTS 4,421,376 A * 12/1983 Cosmos ............... H01R 13/516 439/461
5,411,413 A 5/1995 Yamamoto (Continued)

FOREIGN PATENT DOCUMENTS

EP 590667 A1 4/1994
JP H06-333626 A 12/1994

(Continued)

*Primary Examiner* — Harshad C Patel
(74) *Attorney, Agent, or Firm* — Venjuris, P.C.

(57) ABSTRACT

The connector-equipped wire includes: a terminal-equipped wire that includes a coated wire and a terminal component provided at an end portion of the coated wire; and a connector housing that includes a main body component provided with a cavity, and a cover component mounted to the main body component. A leading end portion of the terminal component is accommodated in the cavity, a rear end portion of the terminal component protrudes outward of the cavity and is covered by the cover component or by the cover component and the main body component, and the cover component is mountable to the main body component through sliding movement in a direction that intersects the longitudinal direction of the cavity in a state in which the (Continued)

rear end portion of the terminal component protrudes outward of the cavity.

9 Claims, 12 Drawing Sheets

(58) Field of Classification Search
USPC .......................................................... 439/877
See application file for complete search history.

(56) References Cited

U.S. PATENT DOCUMENTS

| | | | | | |
|---|---|---|---|---|---|
| 5,762,520 | A * | 6/1998 | Martin | H01R 13/56 439/470 |
| 5,908,327 | A * | 6/1999 | Tsuji | H01R 24/84 439/470 |
| 6,050,861 | A | 4/2000 | Genta et al. | |
| 6,878,009 | B2 * | 4/2005 | Amemiya | H01R 13/5812 439/470 |
| 7,507,108 | B2 * | 3/2009 | Tsuji | H01R 13/5841 439/446 |
| 10,965,054 | B2 * | 3/2021 | Naganuma | H01R 13/506 |
| 2008/0096421 | A1 | 4/2008 | Hass | |
| 2020/0254944 | A1 | 8/2020 | Hashimoto et al. | |

FOREIGN PATENT DOCUMENTS

| | | | |
|---|---|---|---|
| JP | H08-007968 | A | 1/1996 |
| JP | 2006-179438 | A | 7/2006 |
| JP | 2011-146306 | A | 7/2011 |

* cited by examiner

CONNECTOR-EQUIPPED WIRE AND CONNECTOR HOUSING

CROSS REFERENCE TO RELATED APPLICATIONS

This application is a national phase of PCT application No. PCT/JP2021/014464, filed on 5 Apr. 2021, which claims priority from Japanese patent application No. 2020-078196, filed on 27 Apr. 2020, all of which are incorporated herein by reference.

TECHNICAL FIELD

The present disclosure relates to a connector-equipped wire and a connector housing.

BACKGROUND

Patent Document 1 discloses a harness component that includes a connector case, a plurality of connector terminals that are disposed in the connector case, a plurality of wires that are respectively electrically connected to the plurality of connector terminals, and a seal member that is disposed in a gap between the connector case and a mounting portion that is formed in the connector terminal, a solid conductor portion of the wire, or a relay conductor constituted by one conductor for relaying between the connector terminal and the wire.

PRIOR ART DOCUMENT

Patent Document

Patent Document 1: WO 2019/082941 A1

SUMMARY OF THE INVENTION

Problems to be Solved

It is desired that a terminal-equipped wire can be easily accommodated in a connector housing.

In view of this, this disclosure aims to provide a technique with which a terminal-equipped wire can be easily accommodated in a connector housing.

Means to Solve the Problem

A connector-equipped wire according to this disclosure includes a terminal-equipped wire that includes a coated wire and a terminal component provided at an end portion of the coated wire, and a connector housing that includes a main body component provided with a cavity and a cover component mounted to the main body component, in which a leading end portion of the terminal component is accommodated in the cavity, a rear end portion of the terminal component protrudes outward of the cavity and is covered by the cover component or by the cover component and the main body component, and the cover component is mountable to the main body component through sliding movement in a direction that intersects a longitudinal direction of the cavity in a state in which the rear end portion of the terminal component protrudes outward of the cavity.

Effect of the Invention

According to this disclosure, the terminal-equipped wire can be easily accommodated in the connector housing.

DETAILED DESCRIPTION TO EXECUTE THE INVENTION

Figure 1:
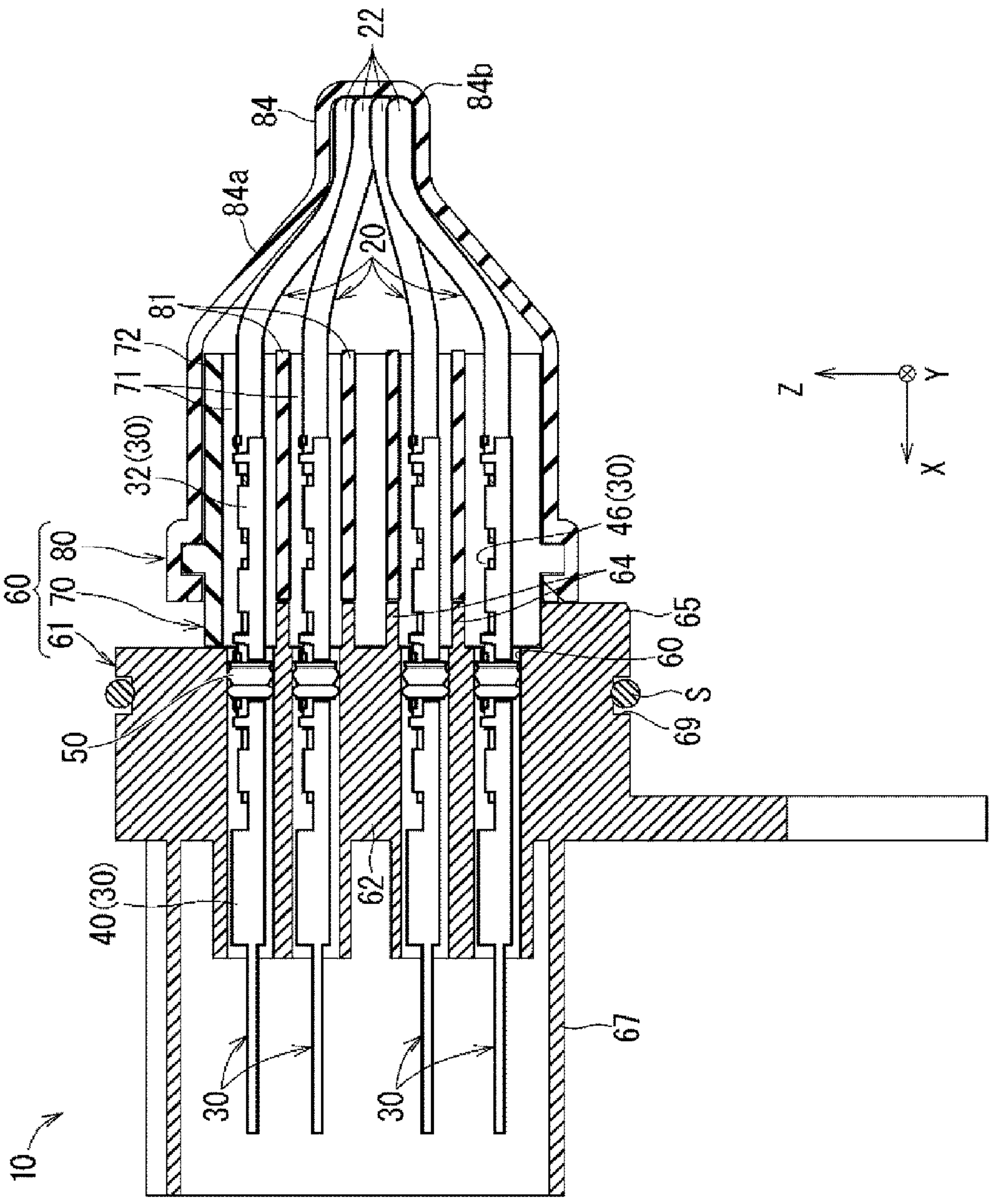
FIG. 1 is a longitudinal cross-sectional view showing a connector housing according to Embodiment 1 and a connector-equipped wire provided with the connector housing.

Description of Embodiments of the Present Disclosure

Firstly, embodiments of the present disclosure will be listed and described.

A connector-equipped wire according to this disclosure is as follows.

(1) A connector-equipped wire includes a terminal-equipped wire that includes a coated wire and a terminal component provided at an end portion of the coated wire, and a connector housing that includes a main body component provided with a cavity, and a cover component mounted to the main body component, in which a leading end portion of the terminal component is accommodated in the cavity, a rear end portion of the terminal component protrudes outward of the cavity and is covered by the cover component or by the cover component and the main body component, and the cover component is mountable to the main body component through sliding movement in a direction that intersects a longitudinal direction of the cavity in a state in which the rear end portion of the terminal component protrudes outward of the cavity. When the terminal component is inserted into the cavity of the main body component before the cover component is mounted, the amount by which the terminal component is inserted into the cavity is reduced. When the cover component is mounted to the main body component after the terminal component has been inserted into the cavity, the rear end portion of the terminal component is covered. As a result, the terminal-equipped wire can be easily accommodated in the connector housing.

(2) In the connector-equipped wire according to (1), the cover component may include a first cover component and a second cover component that are mountable through sliding movement in directions that intersect each other with respect to the main body component in a state in which the rear end portion of the terminal component inserted into the cavity protrudes outward of the cavity, and the first cover component may include a first wall portion covering a portion of the rear end portion of the terminal component that extends in a circumferential direction thereof, and the second cover component may include a second wall portion covering another portion of the rear end portion of the terminal component that extends in the circumferential direction. As a result, the entire circumference of the rear end portion of the terminal component can be covered by two cover components mounted to the main body component.

(3) In the connector-equipped wire according to (1), the main body component may include a first wall portion that is formed on an end surface provided with one opening portion of the cavity and that covers another portion of the rear end portion of the terminal component that extends in the circumferential direction, and the cover component may include a second wall portion that covers a portion of the rear end portion of the terminal component that extends in the circumferential direction. As a result, one cover component is mounted to the main body component, and the entire circumference of the rear end portion of the terminal component can be covered by the main body component and the cover component.

(4) In the connector-equipped wires according to any one of (1) to (3), the main body component and the cover component may be respectively provided with a fitting portion and a fitted portion for maintaining a mounted state, the fitting portion may be fitted to the fitting portion in the direction of sliding movement of the main body component and the cover component, the direction intersecting the longitudinal direction of the cavity. As a result, the fitting portion and the fitted portion can be fitted to each other through sliding movement of the main body component and the cover component in the direction that intersects the longitudinal direction of the cavity.

(5) In the connector-equipped wire according to any one of (1) to (4), the terminal-equipped wire may further include a seal member mounted to an intermediate portion of the terminal component, the seal member may be disposed in the cavity, and a rear end portion of the terminal component, which is located rearward of a portion where the seal member is mounted, protrudes outward from the cavity. Accordingly, the amount by which the seal member moves in the cavity is reduced. As a result, the terminal-equipped wire can be easily accommodated in the connector housing.

(6) In the connector-equipped wire according to (5), a portion of the cavity where the seal member is disposed may have a circular transverse cross-sectional shape, and the rear end portion of the terminal component may be covered by four wall portions, and the four wall portions may be combined together to form a rectangular tubular shape. As a result, the seal member and the inner surface of the cavity are more likely to be in intimate contact with each other. Also, the shape of the wall portions covering the rear end portion of the terminal component results in a simple shape.

(7) Further, the connector housing according to this disclosure is a connector housing in which a terminal-equipped wire whose end portion is provided with a terminal component is to be accommodated, the connector housing including a main body component provided with a cavity into which a leading end portion of the terminal component is insertable, and a cover component mounted to the main body component, in which a rear end portion of the terminal component protrudes outward of the cavity and is covered by the cover component or by the cover component and the main body component, and the cover component is mountable to the main body component through sliding movement in a direction that intersects a longitudinal direction of the cavity in a state in which the rear end portion of the terminal component protrudes outward of the cavity. When the terminal component is inserted into the cavity of the main body component before the cover component is mounted, the amount by which the terminal component is inserted into the cavity is reduced. When the cover component is mounted to the main body component after the terminal component has been inserted into the cavity, the rear end portion of the terminal component is covered. As a result, the terminal-equipped wire can be easily accommodated in the connector housing.

Details of Embodiments of the Present Disclosure

Specific examples of a connector-equipped wire and a connector housing according to the present disclosure will be described below with reference to the drawings. Note that the present disclosure is not limited to these examples, and is defined by the claims, and all changes that come within the meaning and range of equivalency of the claims are intended to be embraced therein.

Embodiment 1

Hereinafter, a connector-equipped wire 10 and a connector housing 60 according to Embodiment 1 will be described. FIG. 1 is a longitudinal cross-sectional view showing the connector housing 60 according to Embodiment 1 and the connector-equipped wire 10 provided with the connector housing 60.

The connector-equipped wire 10 includes terminal-equipped wires 20 and the connector housing 60. An end portion of each terminal-equipped wire 20 is accommodated in an accommodation space of the connector housing 60, resulting in the connector-equipped wire 10. The connector housing 60 includes a main body component 61 and cover components 70 and 80. The main body component 61 is provided with cavities 63. The leading end portion of each terminal-equipped wire 20 is inserted into a cavity 63. The cover components 70 and 80 each include a wall portion that at least partially covers portions of the terminal-equipped wires 20 that protrude from the cavities 63. The space surrounded by the wall portions and the cavities 63 form the accommodation space in the connector housing 60. In this disclosure, a cross-section of the main body component 61 that extends in the longitudinal direction of the cavities 63 is regarded as a longitudinal cross-section, and a cross-section that is orthogonal to the longitudinal direction of the cavities 63 is regarded as a transverse cross-section. In this disclosure, as shown in FIG. 1, the longitudinal direction of the cavities 63 is regarded as the X-direction, and two directions that are orthogonal to the longitudinal direction of the cavities 63 are regarded as the Y-direction and the Z-direction.

Terminal-Equipped Wire

Figure 2:
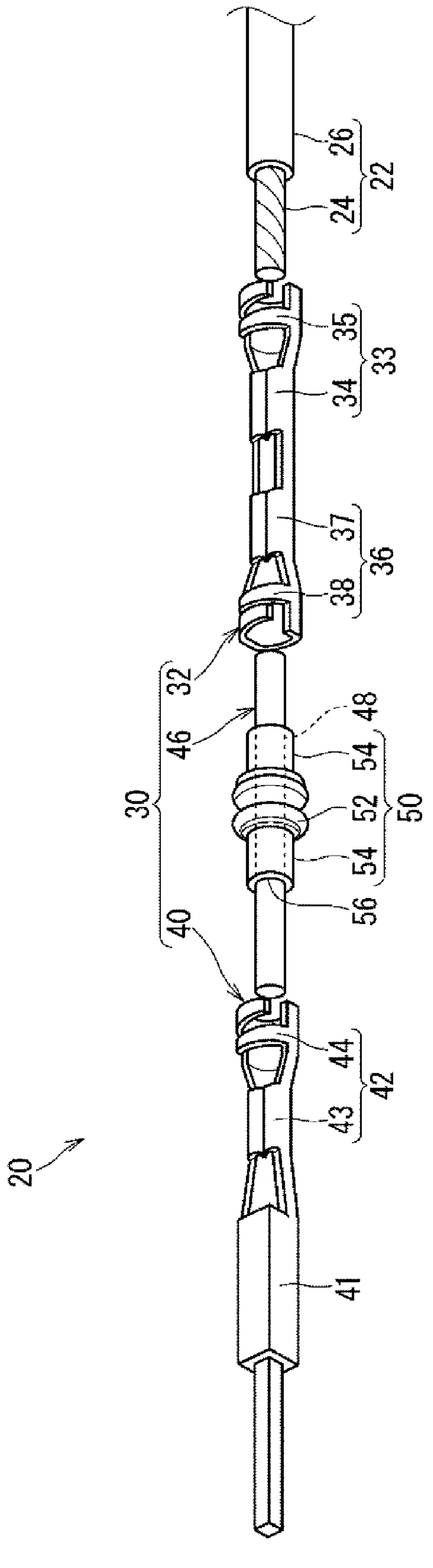
FIG. 2 is an exploded perspective view showing a terminal-equipped wire.

The terminal-equipped wire 20 will be described with reference to FIG. 2 in addition to FIG. 1. FIG. 2 is an exploded perspective view showing the terminal-equipped wire 20.

The terminal-equipped wire 20 includes a coated wire 22 and a terminal component 30. The terminal component 30 and the portion of the coated wire 22 that is connected to the terminal component 30 are accommodated in the accommodation space in the connector housing 60. A portion of the coated wire 22 on the other end side of the portion connected to the terminal component 30 extends outward from the accommodation space in the connector housing 60. The leading end portion of the terminal component 30 is accommodated in the cavity 63 in the accommodation space. The rear end portion of the terminal component 30 protrudes outward of the cavity 63. The rear end portion of the terminal component 30 is accommodated in a space in the accommodation space that is surrounded by the wall portions.

The coated wire 22 includes a conductor core wire 24 and an insulating sheath 26. Here, the conductor core wire 24 is a twisted wire. The twisted wire is formed by twisting a plurality of strands. Such a strand is formed using a conductor made of copper, a copper alloy, aluminum, an aluminum alloy, or the like as a material. The insulating sheath 26 covers the conductor core wire 24. The insulating sheath 26 is formed by extruding a resin material around the conductor core wire 24, or applying an insulating coating thereto. The leading end of the conductor core wire 24 protrudes outward of the insulating sheath 26, forming an exposed core wire portion.

The terminal component 30 includes a wire connection portion 33 connected to the coated wire 22, and a counterpart connection portion 41 to be connected to a counterpart terminal. Here, the terminal component 30 is constituted by three components, i.e., a joint terminal 32, a connector terminal 40, and a relay conductor 46. The wire connection portion 33 is provided on the joint terminal 32. The counterpart connection portion 41 is provided on the connector terminal 40. The relay conductor 46 is connected to the joint terminal 32 and the connector terminal 40. The joint terminal 32 and the connector terminal 40 are connected to each other via the relay conductor 46.

The joint terminal 32 includes the wire connection portion 33 and a relay conductor connection portion 36. Here, the joint terminal 32 is crimped and connected to the coated wire 22 and the relay conductor 46. The joint terminal 32 is formed by bending a conductor plate, for example. Alternatively, the joint terminal 32 may be connected to the coated wire 22 or the relay conductor 46 through welding, insulation displacement, or the like.

The wire connection portion 33 includes a wire barrel 34 and an insulation barrel 35. The wire barrel 34 is crimped to the exposed core wire portion of an end portion of the conductor core wire 24. The insulation barrel 35 is crimped to the insulating sheath 26. The wire barrel 34 and the insulation barrel 35 are open barrels. The insulation barrel 35 may be omitted from the insulation barrel 33.

The relay conductor connection portion 36 includes a wire barrel 37 and an insulation barrel 38. The wire barrel 37 is crimped to the relay conductor 46. The insulation barrel 38 is crimped to a seal member 50. The wire barrel 37 and the insulation barrel 38 are open barrels. The insulation barrel 38 may be omitted from the relay conductor connection portion 36.

The connector terminal 40 includes a counterpart connection portion 41 and a relay conductor connection portion 42. As described above, the counterpart connection portion 41 is formed in a male terminal shape. The counterpart connection portion 41 may also be formed in a female terminal shape. Here, the connector terminal 40 is crimped and connected to the relay conductor 46. The connector terminal 40 is formed by bending a conductor plate, for example. Alternatively, the connector terminal 40 may be connected to the relay conductor 46 through welding, insulation displacement, or the like.

The counterpart connection portion 41 includes a box portion that is formed in a box shape, and a conductor pin. The conductor pin protrudes from a leading end surface of the box portion. The leading end portion of the conductor pin protrudes outward from the cavity 63. The conductor pin is inserted into a female counterpart terminal. A spring contact portion or the like is provided inside the female counterpart terminal as appropriate. The spring contact portion or the like is connected to the conductor pin in the female counterpart terminal.

The relay conductor connection portion 42 includes a wire barrel 43 and an insulation barrel 44. The wire barrel 43 is crimped to the relay conductor 46. The insulation barrel 44 is crimped to the seal member 50. The insulation barrel 44 may be omitted from the relay conductor connection portion 42.

The relay conductor 46 is formed as a single conductor. The relay conductor 46 is formed in a round columnar rod shape. The relay conductor 46 may also be formed in a cylindrical rod shape. The relay conductor 46 is longer than the seal member 50. Two end portions in the longitudinal direction of the relay conductor 46 protrude outward of the seal member 50. Two end portions of the relay conductor 46 are respectively crimped to the wire barrels 37 and 43.

The terminal-equipped wire 20 is provided with a mounting portion 48. The seal member 50 is mounted to the mounting portion 48. The outer surface of the mounting portion 48 has a circular shape. An intermediate portion extending in the longitudinal direction of the relay conductor 46 serves as the mounting portion 48.

Here, the terminal-equipped wire 20 also includes the seal member 50. The seal member 50 is mounted to the intermediate portion of the terminal component 30. The seal member 50 is mounted to the mounting portion 48. The seal member 50 is also accommodated in the accommodation space in the connector housing 60. Here, the seal member 50 is accommodated in the cavity 63 in the accommodation space.

The seal member 50 includes a seal main body 52 and held portions 54. The seal member 50 is provided with a through-hole 56. The relay conductor 46 is passed through the through-hole 56. The seal main body 52 and the held portions 54 are aligned in the axial direction of the through-hole 56. Here, the held portions 54 are respectively provided on two sides of the seal main body 52. A held portion 54 may be provided on only one side of the seal main body 52. The held portions 54 may be omitted.

The seal main body 52 stops a liquid from moving between one opening portion and the other opening portion of the cavity 63 in a state in which the terminal-equipped wire 20 is inserted into the cavity 63. An annular recess and an annular protrusion are alternately continuous with each other in the longitudinal direction on the outer surface of the seal main body 52. The seal main body 52 is positioned between the joint terminal 32 and the connector terminal 40 in the longitudinal direction. The annular protrusions on the seal main body 52 protrude outward of the joint terminal 32 and the connector terminal 40 in a radial direction.

The outer diameter of the seal main body 52 is the same as or larger than the inner diameter of the cavity 63 before the terminal-equipped wire 20 is inserted into the cavity 63. The annular protrusions of the seal main body 52 are in intimate contact with the circumferential surface of the cavity 63 over the entire circumferential direction thereof in the accommodated state.

The held portions 54 are respectively crimped to the insulation barrels 38 and 44 in a state in which the held portions 54 cover the relay conductor 46. As a result, the held portions 54 are positioned and held by the connector terminal 40 and the joint terminal 32, and the seal member 50 is positioned and held by the terminal-equipped wire 20. If the held portions 54 are omitted, the mounting portion 48 is preferably shaped so as to be capable of positioning and holding the seal member 50. A groove may be formed in the mounting portion 48, for example. When the seal member 50 is accommodated in the groove, the seal member 50 is positioned and held by the mounting portion.

The seal member 50 is accommodated in the cavity 63 in the accommodated state. Provision of the seal member 50 stops a liquid from moving between one opening portion and the other opening portion of the cavity 63. Water, oil, and the like are envisioned as liquids to be stopped by the seal member 50. Examples of oil include oil (hydraulic oil) for performing automatic shift control operations in an automatic transmission. Liquid is stopped from moving between one opening portion and the other opening portion of the cavity 63 as follows, for example.

The mounting portion 48 is solid. This inhibits liquid from flowing through the mounting portion 48 and permeating from one of the one opening portion and the other opening portion of the cavity 63 to the other of the one opening portion and the other opening portion. The mounting portion 48 may be hollow. In this case, it is also possible to inhibit liquid from flowing through the mounting portion 48 and permeating from one of the one opening portion and the other opening portion of the cavity 63 to the other of the one opening portion and the other opening portion, as long as at least one side of the mounting portion 48 in the longitudinal direction is closed.

The inner surface (the inner circumferential surface of the through-hole 56) of the seal main body 52 is circular. In the accommodated state, the entire inner surface of the seal main body 52 is in intimate contact with the outer surface of the mounting portion 48 in the circumferential direction thereof. Thus, the seal main body 52 inhibits liquid from flowing between the seal main body 52 and the mounting portion 48 and permeating from one of the one opening portion and the other opening portion of the cavity 63 to the other of the one opening portion and the other opening portion. Note that it is sufficient that the entire inner circumferential surface of at least a portion of the seal main body 52 extending in the longitudinal direction thereof is in intimate contact with the outer surface of the mounting portion 48. The inner surface of the seal main body 52 may be formed smaller than the outer surface of the mounting portion 48 before the seal main body 52 is mounted to the mounting portion 48. The inner surface of the seal main body 52 may be pressed against the outer surface of the mounting portion 48 when subjected to pressure from the cavity 63 in the accommodated state.

The outer surface of the seal main body 52 is circular. The outer surfaces of the annular protrusions of the seal main body 52 are in intimate contact with the circumferential surface of the cavity 63 over the entire circumferential direction thereof in the accommodated state. This inhibits liquid from flowing between the seal main body 52 and the connector housing 60 and permeating from one of the one opening portion and the other opening portion of the cavity 63 to the other of the one opening portion and the other opening portion.

The seal member 50 is disposed in the cavity 63. The rear end portion of the terminal component 30, which is located rearward of a portion where the seal member 50 is mounted, protrudes outward from the cavity 63. Here, an end portion of the relay conductor 46 and the joint terminal 32 are positioned outside the cavity 63.

Connector Housing

Figure 3:
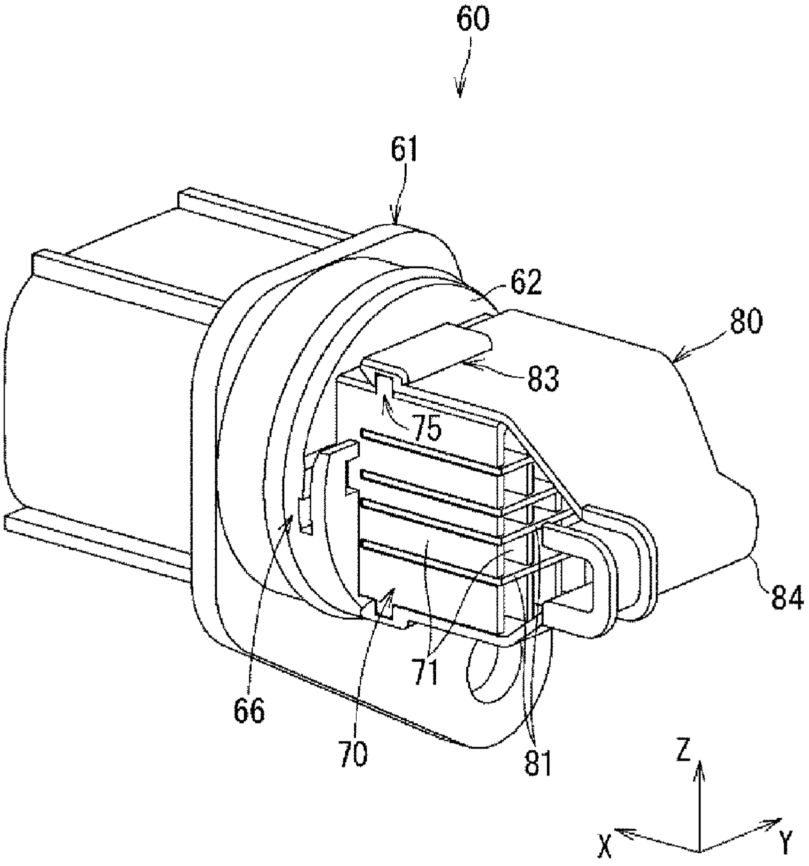
FIG. 3 is a perspective view showing the connector housing according to Embodiment 1.
Figure 4:
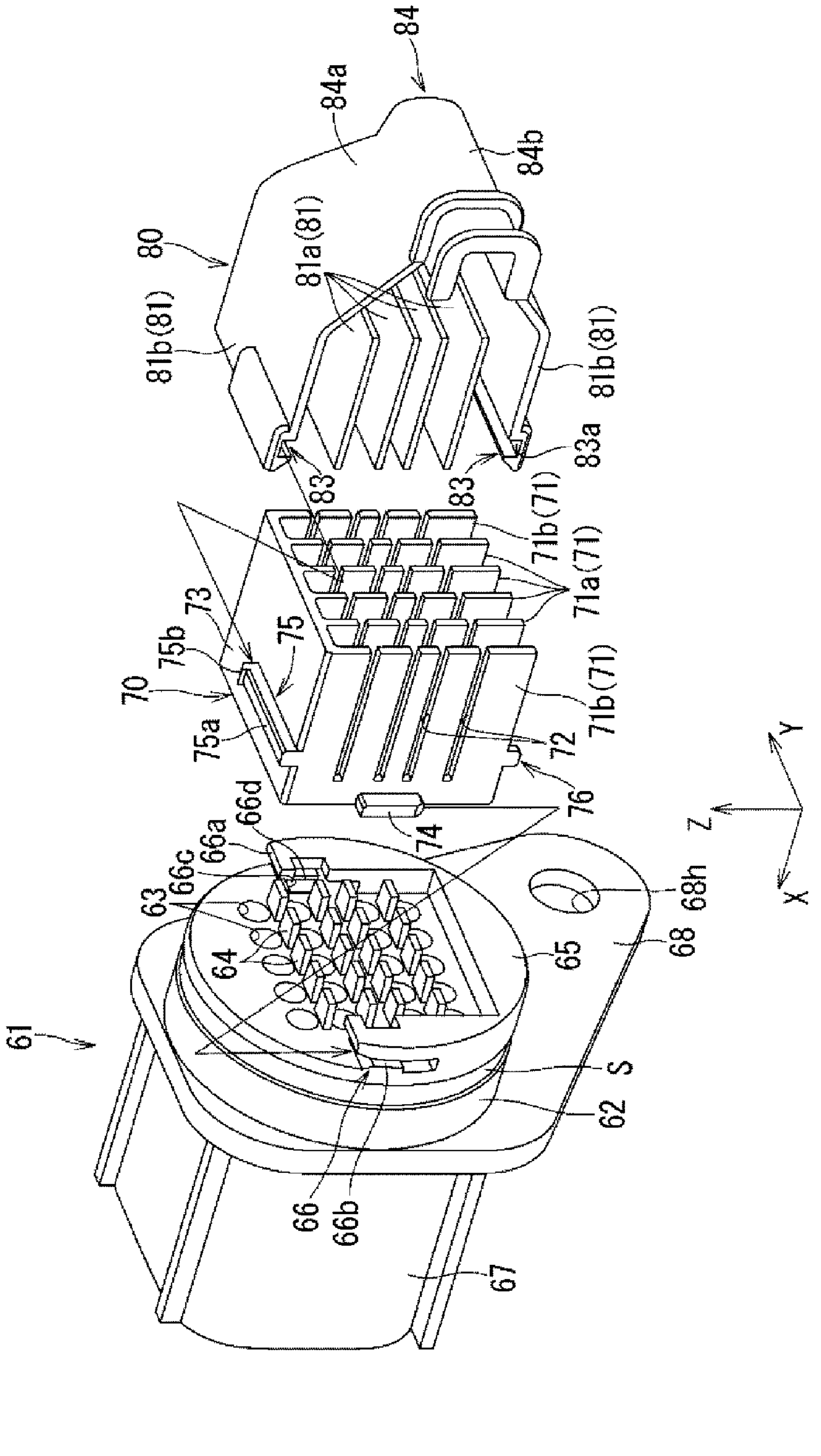
FIG. 4 is an exploded perspective view showing the connector housing according to Embodiment 1.
Figure 5:
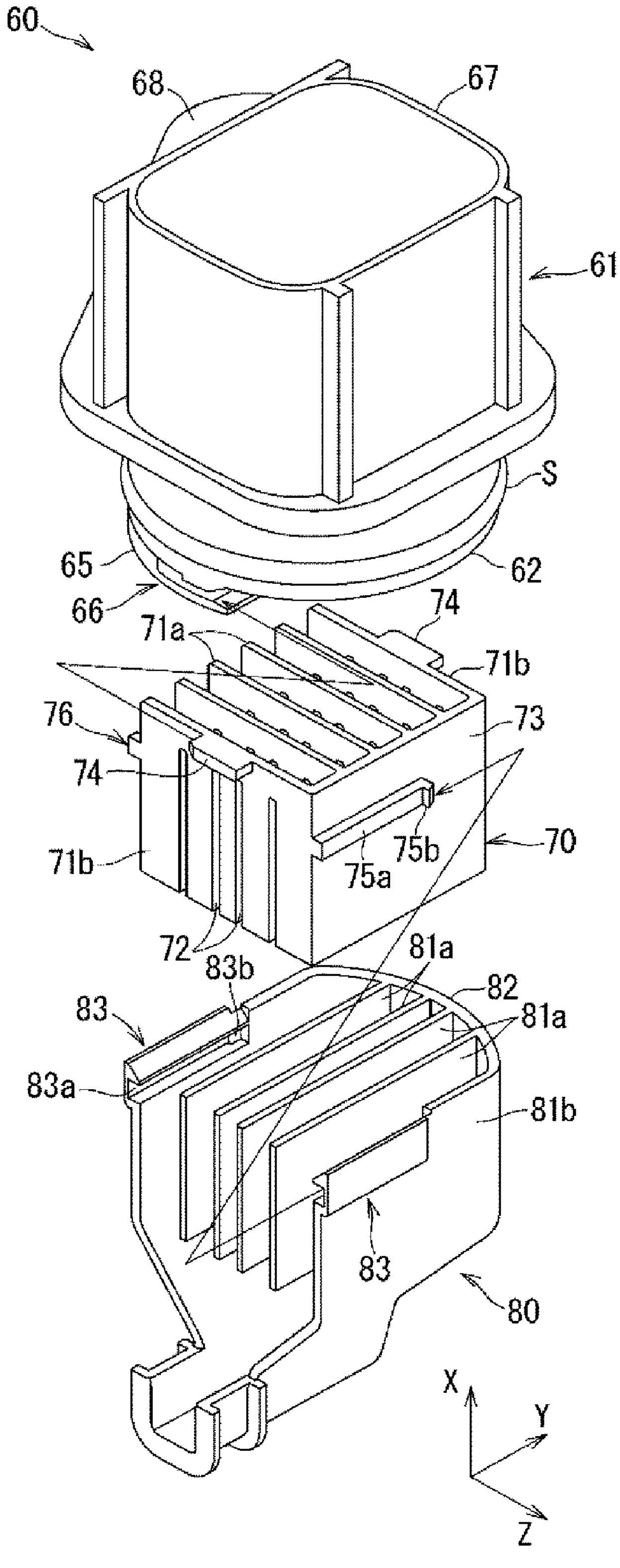
FIG. 5 is an exploded perspective view showing the connector housing according to Embodiment 1.

The connector housing 60 will be described in detail with reference to FIGS. 3 to 5, in addition to FIG. 1. FIG. 3 is a perspective view showing the connector housing 60 according to Embodiment 1. FIG. 4 is an exploded perspective view showing the connector housing 60 according to Embodiment 1. FIG. 5 is an exploded perspective view showing the connector housing 60 according to Embodiment 1. FIGS. 3 and 4 are perspective views of the connector housing 60 as seen in the same direction, and FIG. 5 is a perspective view of the connector housing 60 as seen in a direction that is different from that in FIGS. 3 and 4.

The connector housing 60 includes the main body component 61, and the cover components 70 and 80 that are mounted to the main body component 61.

The main body component 61 includes a housing main body 62. Here, the main body component 61 also includes first fitting portions 66. The main body component 61 is formed using insulating resin as a material. The main body component 61 is an injection molded component, for example.

The housing main body 62 is provided with the cavities 63. At least one cavity 63 is formed. Here, a plurality of cavities 63 are formed. A plurality of cavities 63 are formed so as to be aligned in a plurality of rows and columns. A plurality of cavities 63 may be also formed so as to be aligned in one row and a plurality of columns In FIG. 4, the Z-direction refers to the column direction, and the Y-direction refers to the row direction. In the example shown in FIG. 4, a plurality of cavities 63 are formed so as to be aligned in four rows and five columns.

The cavities 63 are formed to extend through the housing main body 62. One opening portion of each cavity 63 is open on one end surface (end surface facing the negative side in the X-direction) of the housing main body 62. The other opening portion of the cavity 63 is open on the other end surface (end surface facing the positive side in the X-direction) of the housing main body 62.

The terminal-equipped wire 20 is inserted into the cavity 63 from the one opening portion. The terminal-equipped wire 20 and the housing main body 62 are positioned and held at predetermined positions by a lance or the like, for example. The other opening portion is a portion through which a conductor pin provided on the male terminal is passed. Note that this example is a case in which a terminal accommodated in the cavity 63 is a male terminal. In this case, the conductor pin provided on the male terminal passes through the other opening portion and protrudes outward of the cavity 63. Then, the conductor pin provided on the male terminal and the female counterpart terminal are connected to each other, outside the cavity 63. Preferably, the other opening portion is smaller than the box-shaped portion of the counterpart connection portion 41, and is larger than the conductor pin. As a result, the male terminal accommodated in the cavity 63 is kept from falling out from the other opening portion. Naturally, the terminal accommodated in the cavity 63 may be a female terminal. In this case, the conductor pin provided on a male terminal of the counterpart connector is passed through the other opening portion and is inserted into the cavity 63. Then, the female terminal and the conductor pin provided on the male counterpart terminal are connected to each other in the cavity 63.

The seal member 50 is also disposed at a predetermined position in the cavity 63 in a state in which the terminal-equipped wire 20 is disposed at a predetermined position in the cavity 63. Here, the transverse cross-sectional shape of a portion of the cavity 63 where the seal member 50 is disposed is circular. As shown in FIG. 4, the transverse cross-sectional shape of the one opening portion of the cavity 63 is circular in this embodiment. The transverse cross-sectional shape extending from the one opening portion of the cavity 63 to the portion where the seal member 50 is disposed is circular. The transverse cross-sectional shape of the cavity 63 extending from the portion where the seal member 50 is disposed to the other opening portion is set as appropriate.

The main body component 61 is provided with protruding wall portions 64. The protruding wall portions 64 protrude from the one end surface provided with the one opening portions of the cavities 63. The protruding wall portions 64 are provided between cavities 63 that are aligned in the column direction. The protruding wall portions 64 are displaced in the Z-direction with respect to the cavities 63. The protruding wall portions 64 are provided so as to cover portions that cannot be covered by the second cover component 80. The protruding wall portions 64 may be omitted. The protruding length (the length in the X-direction) of each protruding wall portion 64 is approximately the same as the distance between a leading end of a slit 72 in the first cover component 70 and an end surface of the first cover component 70. The width (the length in the Y-direction) of the protruding wall portion 64 is approximately the same as the width of the cavity 63. The thickness (the length in the Z-direction) of the protruding wall portion 64 is the same as or slightly smaller than the length of the gap present between two cavities 63.

Note that the distance between the cavities 63 in the second row and the cavities 63 in the third row is larger than the distance between cavities in other rows in this embodiment. Thus, two protruding wall portions 64 are provided between a cavity 63 in the second row and a cavity 63 in the third row.

The main body component 61 is provided with a protruding frame portion 65. The protruding frame portion 65 positions the first cover component 70. The protruding frame portion 65 protrudes from the one end surface provided with the one opening portions of the cavities 63. The protruding frame portion 65 is provided so as to surround the plurality of cavities 63. One side (the positive side in the Z-direction) of the protruding frame portion 65 is open. The first cover component 70 is inserted via this opening into the protruding frame portion 65. Similarly to the protruding length of the protruding wall portions 64, the protruding length (the length in the X-direction) of the protruding frame portion 65 is approximately the same as the distance between the leading end of the slit 72 in the first cover component 70 and the end surface of the first cover component 70. The first fitting portions 66 are provided at end portions (portions that are displaced in the Y-direction with respect to the opening of the protruding frame portion 65) of the protruding frame portion 65.

The first fitting portions 66 are respectively fitted to first fitted portions 74 provided on the first cover component 70. The first fitting portions 66 will be described later in detail together with the first fitted portions 74.

The main body component 61 is provided with a hood 67. The hood 67 protrudes in the X-direction from the other end surface of the housing main body 62. The hood 67 surrounds the conductor pins of the male terminals. The hood 67 may be omitted from the connector housing 60. If the connector housing 60 accommodates female terminals, the hood 67 may be omitted, for example.

The main body component 61 is provided with a vehicle attachment portion 68. The vehicle attachment portion 68 is provided so as to protrude outward from a side surface of the housing main body 62. The vehicle attachment portion 68 is a portion for attaching the connector housing 60 to a vehicle. The vehicle attachment portion 68 is provided with a mounting hole 68*h*. The vehicle attachment portion 68 is attached to a vehicle by inserting a bolt or the like into the mounting hole 68*h*. The mounting hole 68*h* may also be provided with a metal ring or the like. The vehicle attachment portion 68 may be omitted from the connector housing 60.

Also, the main body component 61 is provided with a seal member mounting portion 69. The seal member mounting portion 69 is provided such that a portion of a side surface of the housing main body 62 is recessed in an annular shape. The seal member mounting portion 69 is provided on one side with respect to the vehicle attachment portion 68. A seal member S such as an O-ring is mounted to the seal member mounting portion 69. The seal member mounting portion 69 may be omitted from the connector housing 60.

The cover components 70 and 80 are mounted to the main body component 61. Here, the cover component 70 includes the first cover component 70 and the second cover component 80.

The first cover component 70 is mounted to the main body component 61. The first cover component 70 is mountable to the main body component 61 through sliding movement in a direction (the Z-direction in this embodiment) that intersects the longitudinal direction (the X-direction in this embodiment) of the cavities 63 in a state in which the rear end portions of the terminal components 30 protrude outward of the cavities 63. The first cover component 70 includes first wall portions 71 and a first connection wall portion 73. Here, the first cover component 70 also includes the first fitted portions 74 and second fitted portions 75 and 76. The first cover component 70 is formed using insulating resin or the like as a material. The first cover component 70 is an injection molded component, for example.

The first wall portions 71 cover portions of the rear end portions of the terminal components 30 extending in the circumferential direction. Here, the first wall portions 71 cover the rear end portion of the corresponding terminal component 30 from two sides in the Y-direction. Each first wall portion 71 is formed in a flat plate shape that expands along the XZ plane. Here, because the cavities 63 are provided in five columns, six first wall portions 71 are provided. Among the six first wall portions 71, four first wall portions 71*a* are provided between the cavities 63 arranged in five columns. The four first wall portions 71*a* separate columns of the plurality of cavities 63. Similarly to the thickness of the protruding wall portion 64, the thickness of the four first wall portions 71*a* is approximately the same as the size of the gap between two cavities 63. Among the six first wall portions 71, two first wall portions 71*b* are provided outside the five columns of the cavities 63. The two first wall portions 71*b* surround the plurality of cavities 63.

Each first wall portion 71 is provided with slits 72. Each slit 72 extends from an end surface of the first wall portion 71 on the negative side in the X-direction to the positive side in the X-direction. The slit 72 does not reach the end surface of the first wall portion 71 on the positive side in the X-direction. The slit 72 is provided between cavities 63 that are aligned in the row direction. The slit 72 is provided at a position corresponding to the protruding wall portion 64. A second wall portion 81, which will be described later, is passed through the corresponding slit 72. The length in the X-direction from the end surface of the first wall portion 71 on the positive side in the X-direction to the leading end of the slit 72 is approximately the same as the dimension of the protruding wall portion 64.

The first connection wall portion 73 connects the plurality (six in this embodiment) of first wall portions 71 to each other. The first connection wall portion 73 is formed in a flat plate shape that expands along the XY plane. The end surface of each first wall portion 71 on the positive side in the Z-direction is connected to a surface of the first connection wall portion 73 facing the negative side in the Z-direction. The first wall portions 71 protrude from the surface of the first connection wall portion 73 facing the negative side in the Z-direction to the negative side in the Z-direction. In this embodiment, no slit 72 is formed in the first connection wall portion 73. In this embodiment, the first connection wall portion 73 covers, from the Z-direction, the rear end portions of the terminal components 30 inserted into the cavities 63 in the first row (the uppermost row in FIG. 4).

The first fitted portions 74 are fitted to first fitting portions 66. The first fitting portions 66 and the first fitted portions 74 maintain the state in which the first cover component 70 is mounted to the main body portion. The first fitting portions 66 are fitted to the first fitted portions 74 in the direction (the Z-direction in this embodiment) of sliding movement of the main body component 61 and the first cover component 70, the direction intersecting the longitudinal direction (the X-direction in this embodiment) of the cavities 63.

More specifically, the first fitted portions 74 are respectively provided outside the two first wall portions 71. Each first fitted portion 74 is provided on the end surface side of the first wall portions 71 where no slits 72 are formed. Each first fitted portion 74 is provided in a rectangular parallelepiped elongated in the Z-direction.

Each first fitting portion 66 includes a protruding piece 66*a* and a protrusion 66*b*. The protruding piece 66*a* protrudes in the Z-direction from an end portion of the protruding frame portion 65 while being spaced apart from the one end surface of the housing main body 62. The protruding piece 66*a* is provided in the manner of a cantilever. The protrusion 66*b* is provided on a portion of the one end surface of the housing main body 62 that faces the protruding piece 66*a*. The protrusion 66*b* protrudes in the X-direction toward the protruding piece 66*a*. The first fitted portion 74 is inserted between the protruding piece 66*a* and the protrusion 66*b*. A guide surface is provided on a surface (a surface facing the positive side in the Z-direction) of the protrusion 66*b* and the protruding piece 66*a* on a side from which the first fitted portion 74 is inserted.

The protrusion 66*b* is formed in a rectangular parallelepiped shape, which corresponds to the shape of the first fitted portion 74, in which a portion that includes one corner portion is cut out. The one corner portion is a corner portion located on the negative side in the Z-direction of the protrusion 66*b* and on the center side of the housing main body 62 in the Y-direction. The first fitted portion 74 is accommodated in the cut out portion of the protrusion 66*b*. The remaining portion of the protrusion 66*b* on the positive side in the Z-direction with respect to the cut out portion serves as a step portion 66*c*. The step portion 66*c* presses the rear side of the first fitted portion 74 inserted into the first fitting portion 66. This inhibits the first cover component 70 from detaching from the main body component 61 to the positive side in the Z-direction. The protruding frame portion 65 presses the front side of the first fitted portion 74 inserted into the first fitting portion 66.

The remaining portion of the protrusion 66*b* on the outer side of the housing main body 62 in the Y-direction with respect to the cut out portion serves as a step portion 66*d*. The step portion 66*d* presses the lateral side of the first fitted portion 74 inserted into the first fitting portion 66. As a result, the first cover component 70 and the main body component 61 are positioned in the Y-direction.

The protruding frame portion 65 of the main body component 61 and the wall portion of the first cover component 70 are in contact with each other in the Y-direction and the Z-direction. As a result, the first cover component 70 and the main body component 61 are positioned in the Y-direction, and the first cover component 70 is kept from detaching from the main body component 61 to the negative side in the Z-direction.

The second fitting portions 75 and 76 are fitted to second fitted portions 83 provided on the second cover component 80. The second fitting portions 75 and 76 will be described later in detail together with the second fitted portions 83.

The second cover component 80 is mounted to the first cover component 70. Therefore, the second cover component 80 is mounted to the main body component 61 via the first cover component 70. The first cover component 70 and the second cover component 80 are mountable to the main body component 61 through sliding movement in directions (the Y-direction in this embodiment) that intersect each other in a state in which the rear end portions of the terminal components 30 inserted into the cavities 63 protrude outward of the cavities 63. The second cover component 80 includes the second wall portion 81 and a second connection wall portion 82. Here, the second cover component 80 also includes the second fitted portions 83. Here, the second cover component 80 also includes a wire regulating portion 84. The second cover component 80 is formed using insulating resin or the like as a material. The second cover component 80 is an injection molded component, for example.

The second wall portion 81 covers the other portion of the rear end portions of the terminal components 30 extending in the circumferential direction. Here, the second wall portion 81 covers the rear end portions of the terminal components 30 from the Z-direction. The second wall portion 81 is formed in a flat plate shape that expands in the XY plane. Six second wall portions 81 are provided. Among the six second wall portions 81, four second wall portions 81*a* are provided between the cavities 63 arranged in four rows. Although the cavities 63 are provided in four rows in this embodiment, because the distance between the second row and the third row is long, two second wall portions 81*a* are provided therebetween. Four second wall portions 81*a* are inserted into the slits 72. The four second wall portions 81*a* separate the rows of the cavities 63. Similarly to the thickness of the protruding wall portion 64, the thickness of the four second wall portions 81*a* is approximately the same as the size of the gap present between two cavities 63. Among the six second wall portions 81, two second wall portions 81*b* are provided outside the four rows of the cavities 63. The two second wall portions 81*b* surround the plurality of cavities 63. Note that the two second wall portions 81*b* surround the first cover component 70 in this embodiment. One of the two second wall portions 81*b* is provided outside the first connection wall portion 73. Thus, one of the two second wall portions 81*b* does not face the terminal components 30.

The second connection wall portion 82 connects the six second wall portions 81. The second connection wall portion 82 is formed in a curved plate shape that corresponds to one end surface of the housing main body 62. The second wall portion 81 and the second connection wall portion 82 are positioned on the negative side in the X-direction relative to the protruding frame portion 65.

Two second fitted portions 83 are provided. The two second fitted portions 83 are respectively fitted to the second fitting portions 75 and 76. The second fitting portions 75 and 76 and the second fitted portions 83 maintain the state in which the first cover component 70 and the second cover component 80 are mounted to the main body component 61. The second fitting portions 75 and 76 are fitted to the second fitted portions 83 in the direction (the Y-direction in this embodiment) of sliding movement of the first cover component 70 and the second cover component 80 in a direction that intersects the longitudinal direction of the cavities 63.

More specifically, the second fitted portions 83 are provided on the inner side of the two second wall portions 81*b*. Portions of the two second wall portions 81*b* protrude outward in the Z-direction. Grooves 83*a* are formed on the inner side of the protruding portions. The grooves 83*a* extend in the Y-direction. An end portion of each groove 83*a* is provided with a fitting hole 83*b*.

The second fitting portion 75 is provided on the outer surface of the first connection wall portion 73. The second fitting portion 75 includes a protrusion 75*a* and a retaining piece 75*b*. The protrusion 75*a* is formed in a rectangular parallelepiped elongated in the Y-direction. The protrusion 75*a* extends from the end surface of the first connection wall portion 73 on the negative side in the Y-direction to an intermediate portion of the first connection wall portion 73 in the Y-direction. The retaining piece 75*b* is provided at a leading end of the protrusion 75*a*. The retaining piece 75*b* protrudes father in the Z-direction than the protrusion 75*a*.

The second fitting portion 76 is provided on the end surface of the first wall portion 71 on the negative side in the Z-direction. The second fitting portion 76 includes four protrusions 76*a* that respectively protrude from four first wall portions 71, and retaining pieces 76*b* that are each provided on one of the four protrusions 76*a*. The second fitting portion 76 is formed in a shape in which a portion between first wall portions 71 is cut out from the second fitting portion 75.

The second fitting portions 75 and 76 are inserted into the second fitted portions 83 via the grooves 83*a*. When retaining pieces 75*b* and 76*b* pass through the fitting holes 83*b* and are fitted to peripheral edge portions of the fitting holes 83*b*, the second fitting portions 75 and 76 are fitted to the second fitted portions 83.

The wire regulating portion 84 regulates the route of the coated wire 22 that extends outward of the accommodation space. In this embodiment, the wire regulating portion 84 bends the coated wires 22, which extend from the accommodation space to the negative side in the X-direction, to the negative side in the Y-direction. Specifically, the wire regulating portion 84 includes a guide portion 84*a* and a regulating portion 84*b*. The guide portion 84*a* is formed so as to be inclined from the two second wall portions 81*b* and the second connection wall portion 82 toward the regulating portion 84*b*. The guide portion 84*a* is formed such that a transverse cross-section thereof gradually decreases. The coated wires 22 that extend from the accommodation space in the Z-direction in a spread out state are gathered in the Z-direction by the guide portion 84*a*. The regulating portion 84*b* is formed in a frame shape in which a portion connected to the guide portion 84*a* and a portion facing the negative side in the Y-direction are open. The regulating portion 84*b* covers the negative side in the X-direction of the coated wires 22. As a result, the coated wires 22 are bent to the negative side in the Y-direction. The wire regulating portion 84 need not be provided in the connector housing 60.

Method for Manufacturing Connector-Equipped Wire

When the connector-equipped wire 10 is to be manufactured, first, the terminal-equipped wire 20 and the disassembled connector housing 60 are prepared. Then, the terminal-equipped wire 20 is inserted into the main body component 61. At this time, because the length of the cavity 63 of the main body component 61 is shorter than the length of the terminal component 30, the amount by which the terminal-equipped wire 20 is inserted into the cavity 63 is reduced. Also, on the outer side of the one opening portion of the cavity 63, in a portion where the protruding wall portion 64 is not provided, the terminal-equipped wire 20 is insertable into the cavity 63 while holding the terminal component 30. As a result, when the terminal-equipped wire 20 is inserted into the cavity 63, even if the terminal-equipped wire 20 comes into contact with the inner surface of the cavity 63, the terminal-equipped wire 20 is unlikely to bend. Also, because a portion in which the seal member 50 is to be accommodated is present at a position close to the one opening portion of the cavity 63, the amount by which the seal member 50 moves in the cavity 63 is reduced. As a result, the terminal-equipped wires 20 can be easily inserted into the cavities 63.

Figure 6:
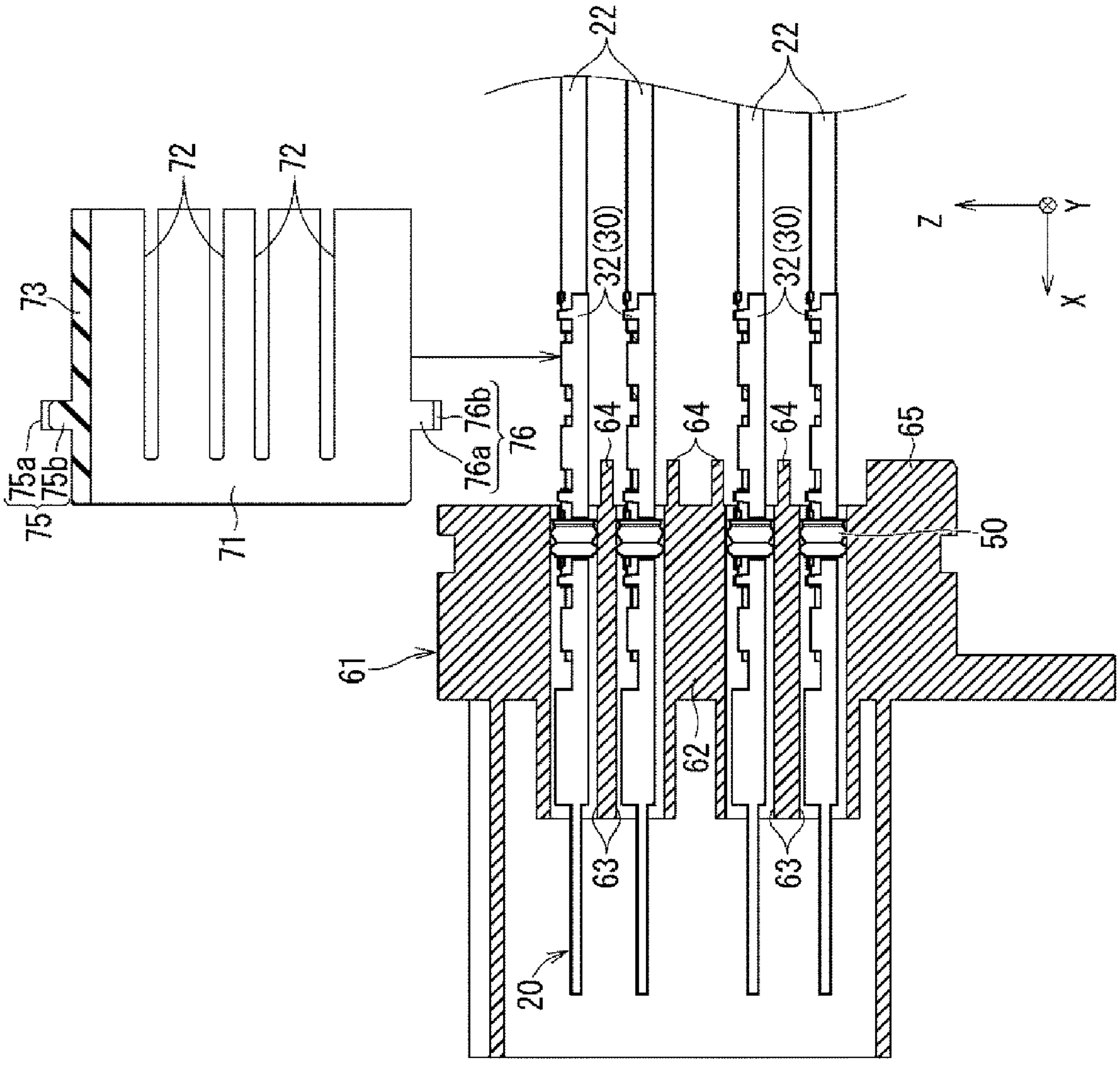
FIG. 6 is a diagram illustrating how a first cover component is mounted to a main body component.
Figure 7:
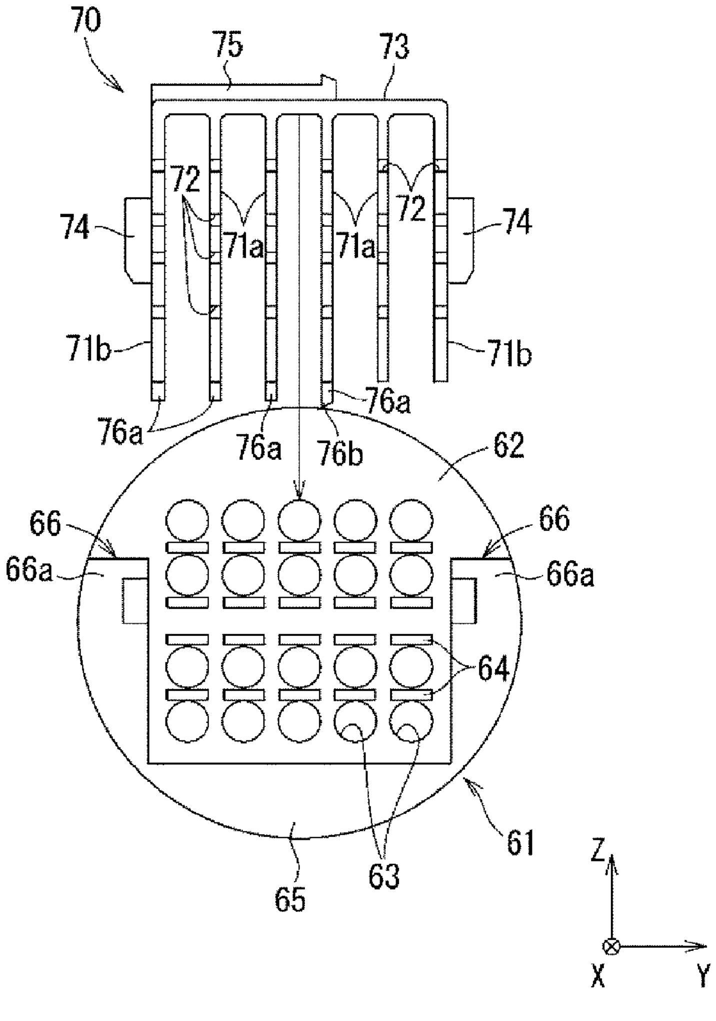
FIG. 7 is a diagram illustrating how the first cover component is mounted to the main body component.

Once the terminal-equipped wires 20 have been inserted into the main body component 61, as shown in FIGS. 6 and 7, the first cover component 70 is mounted to the main body component 61. FIGS. 6 and 7 are diagrams illustrating how the first cover component 70 is mounted to the main body component 61. FIG. 6 is a cross-sectional view, and FIG. 7 is a front view.

The first cover component 70 is mounted to the main body component 61 through sliding movement from the positive side in the Z-direction. Here, four first wall portions 71 are inserted between the terminal components 30 and the protruding wall portions 64 that are aligned in the column direction. Also, two first wall portions 71 are inserted between the protruding frame portion 65 and the protruding wall portions 64 and the terminal components 30. Further, the first fitted portions 74 are respectively inserted into the first fitting portions 66. At this time, the first cover component 70 can be mounted to the main body component 61 by sliding the first cover component 70 in a state in which the end surface of the first cover component 70 on the positive side in the X-direction faces the one end surface of the housing main body 62. Also, at this time, the main body component 61 and the first cover component 70 are fitted so as to face each other by inserting the first wall portions 71 before the first fitted portions 74 are inserted. Accordingly, the first cover component 70 can be easily mounted to the main body component 61.

Figure 8:
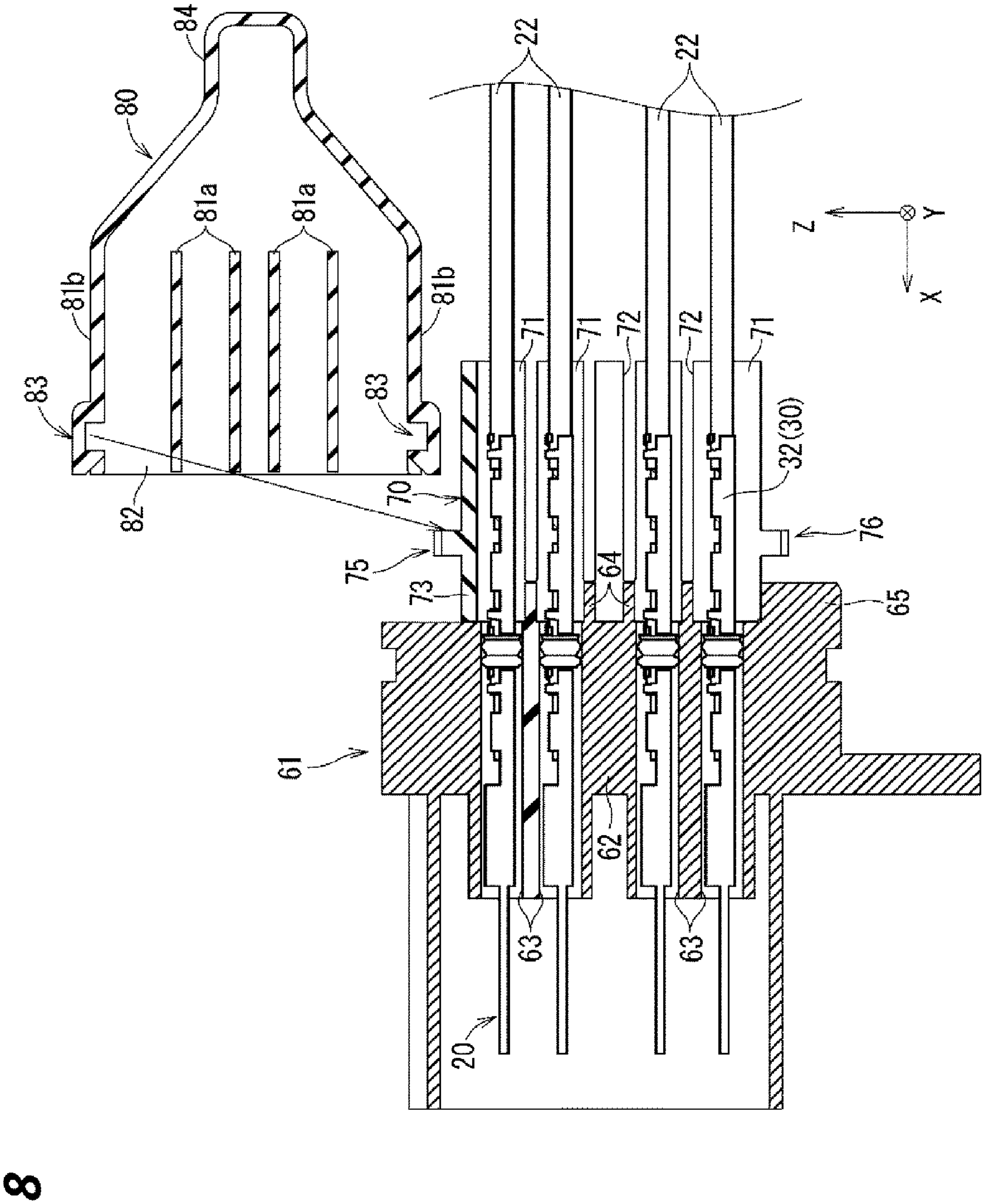
FIG. 8 is a diagram illustrating how a second cover component is mounted to the first cover component.
Figure 9:
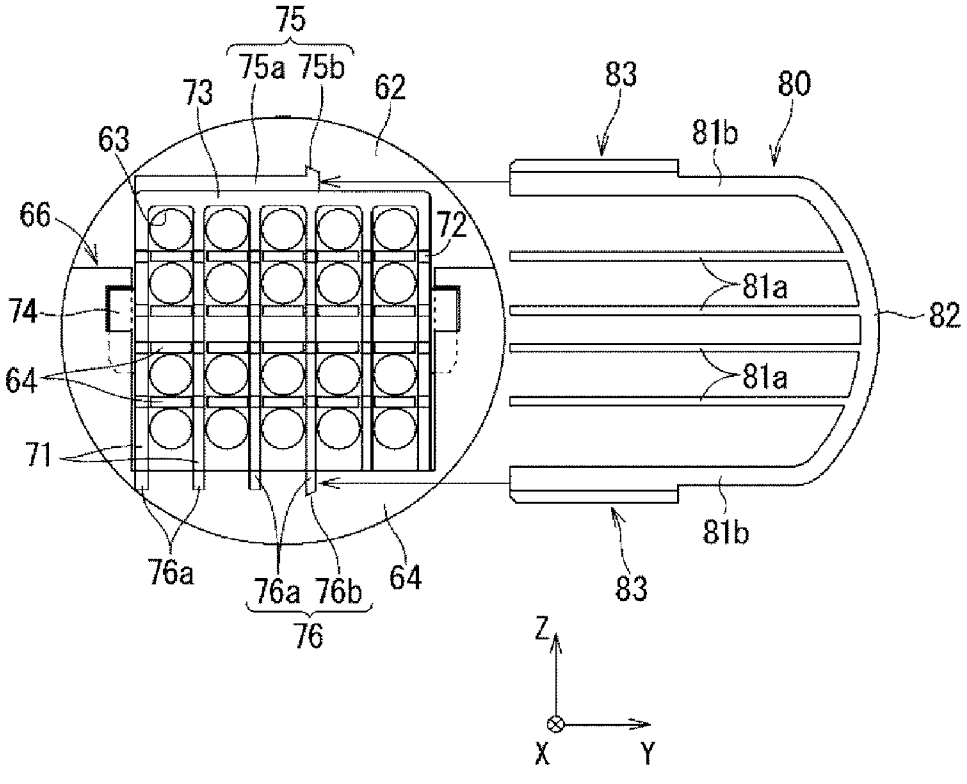
FIG. 9 is a diagram illustrating how the second cover component is mounted to the first cover component.

Once the first cover component 70 has been mounted to the main body component 61, as shown in FIGS. 8 and 9, the second cover component 80 is mounted to the first cover component 70. FIGS. 8 and 9 are diagrams illustrating how the second cover component 80 is mounted to the first cover component 70. FIG. 8 is a cross-sectional view, and FIG. 9 is a front view.

The second cover component 80 is mounted to the first cover component 70 mounted to the main body component 61 through sliding movement from the positive side in the Y-direction. Here, four second wall portions 81 are inserted into the slits 72. Four second wall portions 81 are inserted between terminal components 30 that are aligned in the row direction. Also, the first cover component 70 is inserted between two second wall portions 81. Further, the second fitting portions 75 and 76 are respectively inserted into the second fitted portions 83. At this time, the second cover component 80 can be mounted to the first cover component 70 by sliding the second cover component 80 in a state in which the end surface of the second cover component 80 that faces the positive side in the X-direction faces the end surface of the protruding frame portion 65 that faces the negative side in the X-direction. Also, at this time, inserting the second wall portion 81 before inserting the second fitting portions 75 and 76 results in the first cover component 70 and the second cover component 80 being aligned so as to be fitted to each other. Accordingly, the first cover component 70 and the second cover component 80 can be easily mounted to the main body component 61.

When the first cover component 70 and the second cover component 80 are mounted to the main body component 61, the rear end portion of each terminal component 30 is covered by four wall portions. The four wall portions are combined together to form a rectangular tubular shape. That is, the transverse cross-sectional shape of the space surrounded by four wall portions is a rectangle. Here, a combination of the four wall portions covering the rear end portions of the terminal components 30 changes depending on the positions of the cavities 63 into which the terminal components 30 are inserted, the position where the terminal components 30 protrude from the cavities 63, and the like.

More specifically, of the rear end portion of the terminal component 30 inserted into each cavity 63 in the first row (the uppermost row in FIG. 9), the four sides of a portion near the cavity 63 are covered by two first wall portions 71, one protruding wall portion 64, and one first connection wall portion 73. Of the rear end portion of the terminal component 30 inserted into each cavity 63 in the first row, the four sides of a portion distant from the cavity 63 are covered by two first wall portions 71, one second wall portion 81, and one first connection wall portion 73.

Of the rear end portion of the terminal component 30 inserted into each cavity 63 in the second row and the third row (the second row and the third row from top in FIG. 9), the four sides of a portion near the cavity 63 are covered by two first wall portions 71 and two protruding wall portions 64. Of the rear end portion of the terminal component 30 inserted into each cavity 63 in the second row and the third row, the four sides of a portion distant from the cavity 63 are covered by two first wall portions 71 and two second wall portions 81.

Of the rear end portion of the terminal component 30 inserted into each cavity 63 in the fourth row (in the lowest row in FIG. 9), the four sides of a portion near the cavity 63 are covered by two first wall portions 71, one protruding wall portion 64, and one protruding frame portion 65. Of the rear end portion of the terminal component 30 inserted into each cavity 63 in the fourth row, the four sides of a portion distant from the cavity 63 are covered by two first wall portions 71 and two second wall portions 81.

Effects etc., of Embodiment 1

According to the connector-equipped wire 10 configured as described above, as a result of the terminal components 30 being inserted into the cavities 63 of the main body component 61 before the cover components 70 and 80 are mounted, the amount by which the terminal components 30 are inserted into the cavities 63 is reduced. When the cover components 70 and 80 are mounted to the main body component 61 after the terminal components 30 have been inserted into the cavities 63, the rear end portions of the terminal components 30 are covered. As a result, the terminal-equipped wires 20 can be easily accommodated in the connector housing 60.

Also, the entire circumference of the rear end portions of the terminal components 30 can be covered by the first wall portions 71 provided on the first cover component 70, and the second wall portions 81 provided on the second cover component 80. As a result, the entire circumference of the rear end portions of the terminal components 30 can be covered by the two cover components 70 and 80 mounted to the main body component 61.

Also, the first fitting portions 66 are fitted to the first fitted portions 74 in the direction of sliding movement of the main body component 61 and the first cover component 70, the direction intersecting the longitudinal direction of the cavities 63. As a result, the first fitting portions 66 can be fitted to the first fitted portions 74 during sliding movement of the main body component 61 and the first cover component 70 in the direction that intersects the longitudinal direction of the cavities 63. Similarly, the second fitting portions 75 and 76 are fitted to the second fitted portions 83 in the direction of sliding movement of the first cover component 70 and the second cover component 80, the direction intersecting the longitudinal direction of the cavities 63. As a result, the second fitting portions 75 and 76 can be fitted to the second fitted portions 83 during sliding movement of the first cover component 70 and the second cover component 80 in the direction that intersects the longitudinal direction of the cavities 63.

The seal member 50 is disposed in the cavity 63, and the rear end portion of the terminal component 30, which is located rearward of the portion where the seal member 50 is mounted, protrude outward from the cavity 63. As a result, the amount by which the seal member 50 moves in the cavity 63 is reduced. Accordingly, the terminal-equipped wires 20 can be easily accommodated in the connector housing 60.

Further, the transverse cross-sectional shape of a portion of the cavity 63 where the seal member 50 is disposed is circular. As a result, the inner surfaces of the cavities 63 are likely to be in intimate contact with the seal member 50. Also, the four wall portions covering the rear end portions of the terminal components 30 are combined together to form a rectangular tubular shape. Accordingly, the shape of the wall portions covering the rear end portions of the terminal components 30 results in a simple shape.

Embodiment 2

Figure 10:
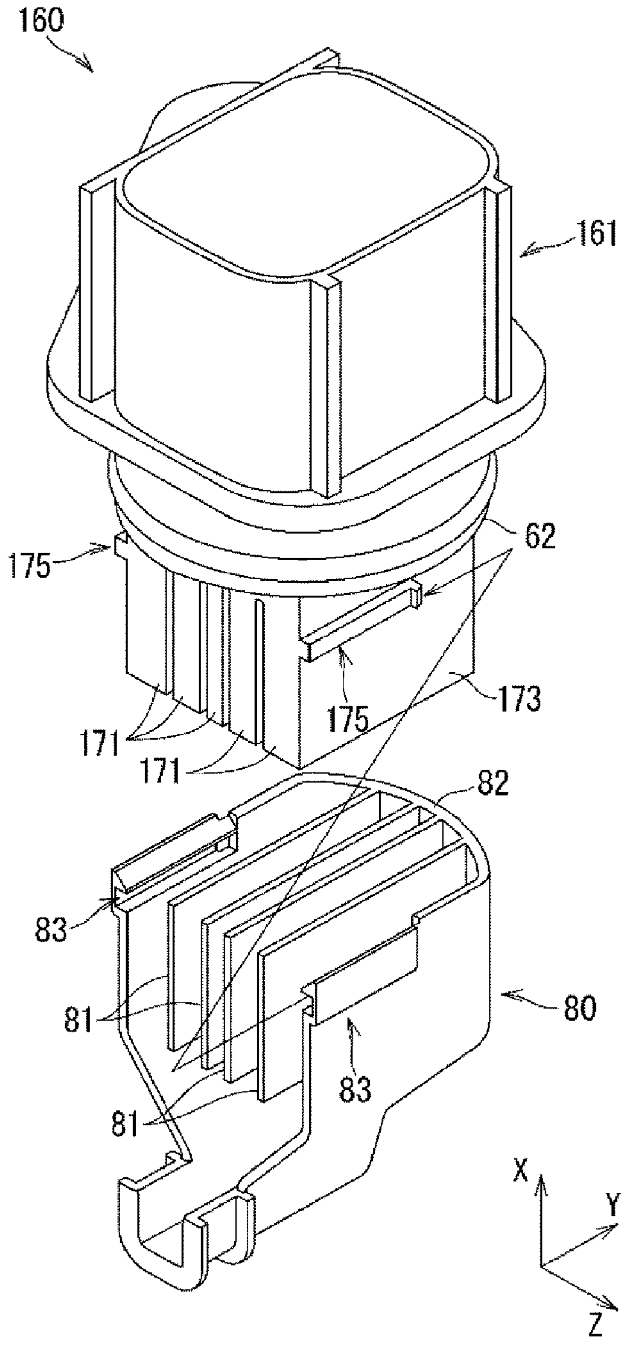
FIG. 10 is an exploded perspective view showing a connector housing according to Embodiment 2.
Figure 11:
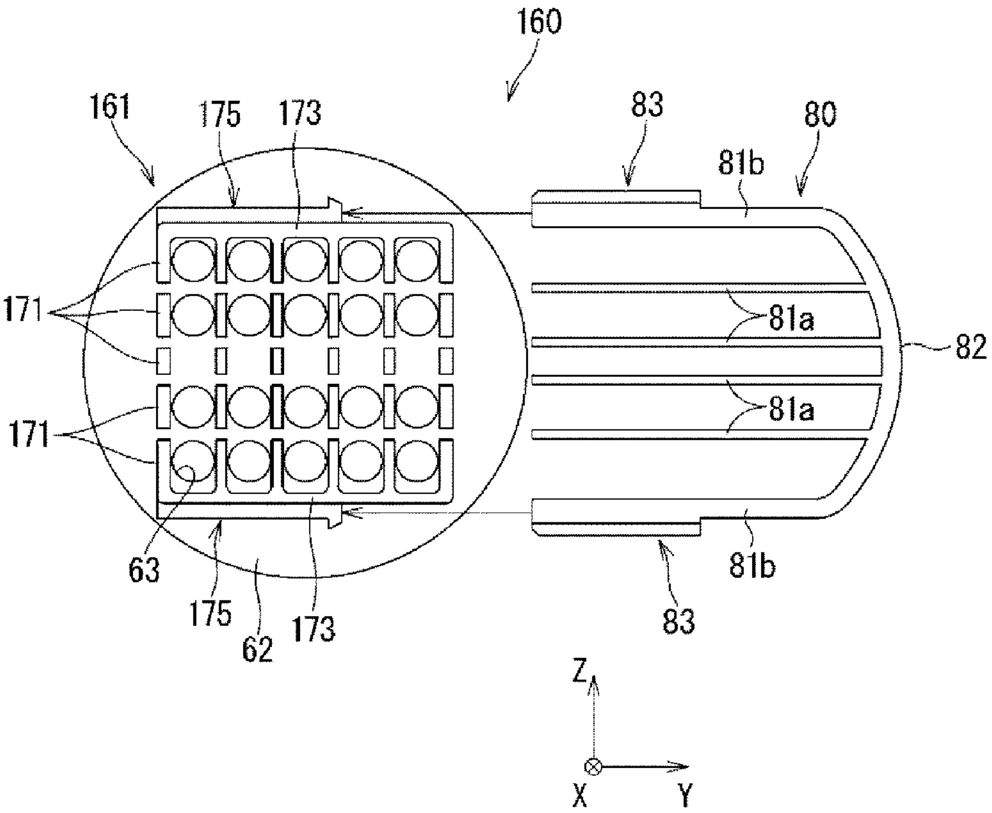
FIG. 11 is a diagram illustrating how the cover component is mounted to the main body component.

A connector housing according to Embodiment 2 will be described. FIG. 10 is an exploded perspective view showing a connector housing 160 according to Embodiment 2. FIG. 11 is a diagram illustrating how the cover component 80 is mounted to a main body component 161. Note that constituent elements that are the same as those described thus far are given the same reference numerals, and are not described in the following description.

The connector housing 160 includes a main body component 161 and a cover component 80. In the connector housing 160, the rear end portion of a terminal component 30 also protrudes outward of the cavity 63 of the main body component 161. Also, the rear end portion of the terminal component 30 is covered by first wall portions 171 and second wall portions 81. The first wall portions 171 cover a portion of the rear end portion of the terminal component 30 that extends in the circumferential direction, and the second wall portions 81 cover another portion of the rear end portion of the terminal component 30 that extends in the circumferential direction. The connector housing 160 differs from the connector housing 60 in that the number of cover components 80 is one. Because the number of cover components 80 is one, the first wall portions 171 are provided on the main body component 161. The second wall portions 81 are provided on the cover component 80.

Note that, in the examples shown in FIGS. 10 and 11, the main body component 161 has a shape obtained by omitting or adding some constituent elements (e.g., the protruding wall portion 64, the protruding frame portion 65, the first fitting portion 66, and the first fitted portion 74, and the like) from/to the shape obtained by combining the main body component 61 and the first cover component 70 in Embodiment 1 together. The cover component 80 is the same as the second cover component 80. Therefore, a first wall portion 171 of the main body component 161 of this example is formed in a shape corresponding to the first wall portion 71 of the first cover component 70. The second wall portion 81 of the cover component 80 in this example is the same as the second wall portion 81 of the second cover component 80.

As shown in FIG. 11, the cover component 80 is mountable to the main body component 161 through sliding movement in a direction (the Y-direction) that intersects the longitudinal direction (the X-direction) of the cavities 63 in a state in which the rear end portions of the terminal components 30 protrude outward of the cavities 63. As a result, one cover component 80 is mounted to the main body component 161, and the entire circumference of each rear end portion of the terminal components 30 can be covered by the main body component 161 and the cover component 80. Also, the main body component 161 and the cover component 80 are fitted to each other using fitting portions 175 and fitted portions 83.

Specifically, the main body component 161 is provided with first wall portions 171, first connection wall portions 173, and the fitting portions 175. The first wall portions 171 and the first connection wall portions 173 protrude from the end surface provided with the one opening portions of the cavities 63. The cavities 63 in the main body component 161 are provided so as to be aligned in four rows and five columns in the same manner as in Embodiment 1. The first wall portions 171 are arranged such that the slits 72 formed in the first wall portions 71 reach the other end surface of the first wall portions 71 so as to divide the first wall portion 71. That is, the first wall portions 171 cover two sides of each cavity 63 in the Y-direction. Six first wall portions 171 are provided in one row. The first wall portions 171 that are provided in adjacent rows are spaced apart in the Y-direction.

Two first connection wall portions 173 are provided. Two first connection wall portions 173 are formed in the same shape as the first connection wall portions 73 in the first cover component 70. Similarly to the first connection wall portion 73, one of the two first connection wall portions 173 is located outside the cavities 63 in the first row (the uppermost row in FIG. 11). This first connection wall portion 173 connects the six first wall portions 171 provided adjacent to the cavities 63 in the first row. The other first connection wall portion 173 is located outside the cavities 63 in the fourth row (the lowermost row in FIG. 11). This first connection wall portion 173 connects the six first wall portions 171 provided adjacent to the cavities 63 in the fourth row.

Two fitting portions 175 are provided. The two fitting portions 175 are respectively provided on the outer side of the first connection wall portions 173. The two fitting portions 175 have the same shape as the second fitting portion 75 described above. One of the two fitting portions 175 is formed at the same position as the second fitting portion 75 described above. The other one of the two fitting portions 175 is formed at the same position as the second fitting portion 76 described above. Therefore, the second fitting portion 76 is omitted, and the fitting portions 175 are provided instead.

When the cover component 80 is mounted to the main body component 161, the rear end portion of each terminal component 30 is covered by four wall portions. The four wall portions are combined together to form a rectangular tubular shape. That is, the transverse cross-sectional shape of the space surrounded by the four wall portions is a rectangle. Here, a combination of the four wall portions covering the rear end portions of the terminal components 30 changes depending on the positions of the cavities 63 into which the terminal components 30 are inserted.

More specifically, the four sides of the rear end portion of the terminal component 30 inserted into each cavity 63 in the first row (the uppermost row in FIG. 11) and the fourth row (the lowermost row in FIG. 11) are covered by two first wall portions 171, one second wall portion 81, and one first connection wall portion 173. The four sides of the rear end portion of the terminal component 30 inserted into each cavity 63 in the second row and the third row (the second row and the third row from top in FIG. 11) are covered by two first wall portions 171 and two second wall portions 81.

MODIFICATION EXAMPLES

Figure 12:
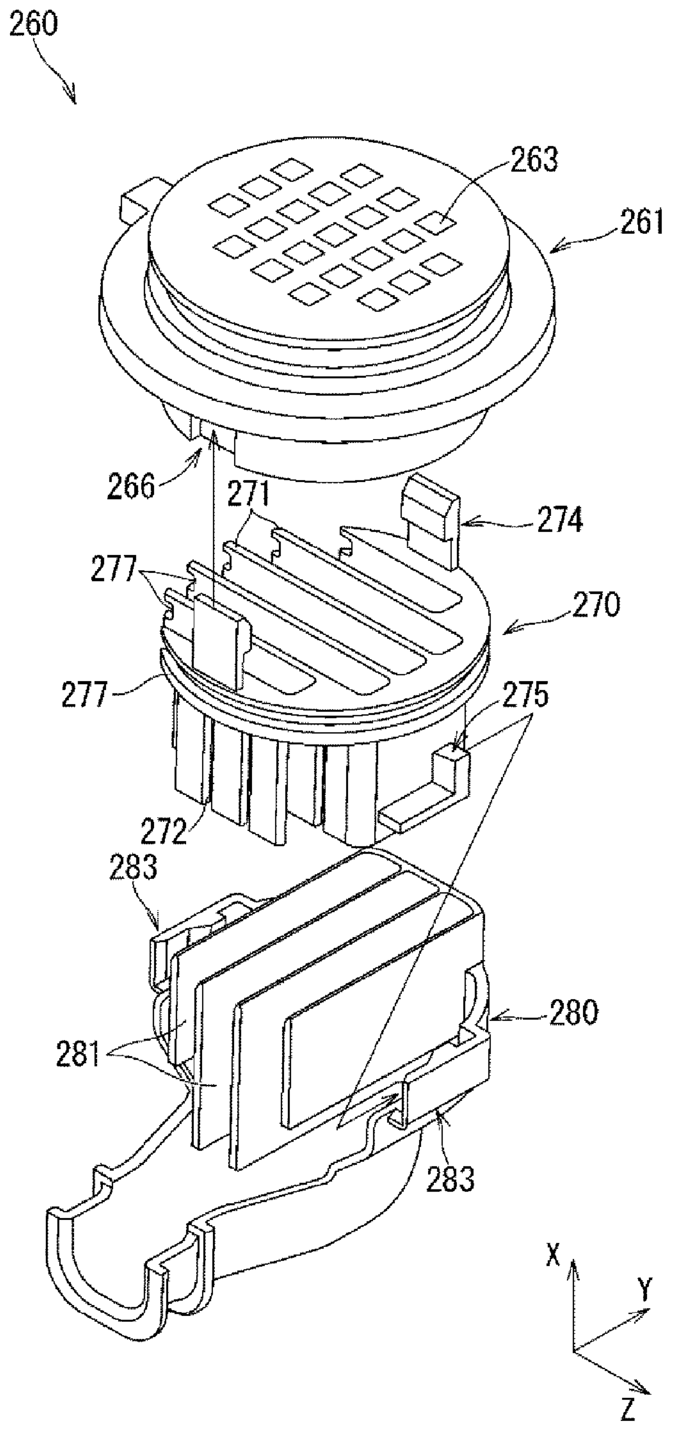
FIG. 12 is an exploded perspective view showing a modification example of the connector housing.

FIG. 12 is an exploded perspective view showing a modification example of the connector housing. Although Embodiment 1 was described in which the first fitting portions 66 are fitted to the first fitted portions 74 in the direction of sliding movement of the main body component 61 and the first cover component 70, the direction intersecting the longitudinal direction of the cavities 63, this is not a required configuration. As shown in FIG. 12, a configuration may be adopted in which the first fitting portions are respectively fitted to the first fitted portions in the longitudinal direction of the cavities 63.

In a connector housing 260 shown in FIG. 12, first fitting portions 266 of a main body component 261 are fitted to first fitted portions 274 of a first cover component 270 in the longitudinal direction of cavities 263 (the X-direction in FIG. 12). In this case, first, the first cover component 270 is moved in a direction (the Z-direction in FIG. 12) that intersects the X-direction with respect to the main body component 261 at a position distanced from the main body component 261 in the X-direction, and the first wall portion 271 of the first cover component 270 is inserted between terminal components 30 that protrude from the cavities 263. Then, the first cover component 270 is moved in the X-direction with respect to the main body component 261, and the first fitting portions 266 are fitted to the first fitted portions 274.

The first cover component 270 and a second cover component 280 are mounted in the same manner as the first cover component 70 and the second cover component 80. That is, second wall portions 281 are inserted into slits 272 formed in the first wall portions 271 through sliding movement of the first cover component 270 and the second cover component 280 in the Y-direction. Also, the second fitting portions 275 are fitted to second fitted portions 283 through sliding movement of the first cover component 270 and the second cover component 280 in the Y-direction. The first cover component and the second cover component may also be configured to be fitted to each other in the longitudinal direction of the cavities 263. Also, if the number of cover components is one as in Embodiment 2, the main body component and the cover component may be configured to be fitted each other in the longitudinal direction of the cavities.

Note that the first cover component 270 is provided with seal member mounting portions 277 in the connector housing 260. The seal member mounting portions 277 are also formed on the first wall portions 271. Because the first cover component 270 is a component inserted between rear end portions of the terminal components 30 that protrude from the cavities 263, it is difficult to form a completely circular shape around the X-axis. Thus, the seal member mounting portions 277 are not continuous between the first wall portions 271 in the circumferential direction.

Further, although a configuration was described above in which each terminal component 30 includes three components, i.e., the joint terminal 32, the connector terminal 40, and the relay conductor 46, this is not a required configuration. One or both of the joint terminal 32 and the relay conductor 46 may be omitted. If one or both of the joint terminal 32 and the relay conductor 46 are omitted, the wire connection portion 33 is provided on the remaining terminal component 30. Also, the mounting portion 48 is provided on the terminal component 30 or the conductor core wire 24.

Specifically, if both of the joint terminal 32 and the relay conductor 46 are omitted, the wire connection portion is provided on a connector terminal. The mounting portion may be provided on a connector terminal or the conductor core wire 24. If the mounting portion is provided on a connector terminal, it is preferable that the mounting portion is formed in an annular shape as is the case with a closed barrel, and a portion of the mounting portion on the counterpart connection portion side is closed. If the mounting portion is provided on the conductor core wire 24, it is preferable that the conductor core wire 24 is a single core wire constituted by one conductor, and the seal member 50 is mounted to the conductor core wire 24 such that the seal main body is positioned between the insulating sheath 26 and the connector terminal.

If one of the joint terminal 32 and the relay conductor 46 is omitted, the function of the omitted one is integrated into the function of the other. The function of the joint terminal 32 may be integrated into that of the relay conductor, for example. In this case, the wire connection portion is provided on the relay conductor.

Also, the seal member 50 may be omitted from the terminal-equipped wire 20. Further, the inner surface of each cavity 63 need not be circular. The inner surface of the cavity 63 may be rectangular or the like.

Also, as shown in FIG. 7, each protruding wall portion 64 is formed on the main body component 61 in the height direction of the terminal component 30 with respect to the one opening portion of the cavity 63. Thus, in the main body component 61, the left and right sides in the left-right direction of the terminal component 30 are open with respect to the one opening portion of the cavity 63. Note that the height direction of the terminal component 30 refers to a direction in which a crimping piece protrudes from the bottom portion of each barrel, and refers to the Z-direction in the drawings. Also, the left-right direction of the terminal component 30 refers to a direction in which base end portions of two crimping pieces are aligned in each barrel, and refers to the Y-direction in the drawings. As shown in FIG. 11, in the main body component 161, the first wall portions 171 are formed in the left-right direction of the terminal components 30 with respect to the one opening portions of the cavities 63. Thus, in the main body component 161, sides in the height direction of each terminal component 30 are open with respect to the one opening portion of the cavity 63. The protruding wall portions 64 of the main body component 61 may be formed in the left-right direction of the terminal components 30 with respect to the cavities 63, and sides in the height direction of the terminal components 30 may be open as with the first wall portions 171 of the main body component 161. Further, the first wall portions 171 of the main body component 161 may be formed in the height direction of the terminal components 30 with respect to the cavities 63, and sides in the left-right direction of the terminal components 30 may be open as in the protruding wall portions 64 of the main body component 61.

Note that configurations described in the above-described embodiments and modification examples can be combined as appropriate as long as no contradiction arises therein.

LIST OF REFERENCE NUMERALS

10 Connector-equipped wire
20 Terminal-equipped wire
22 Coated wire
24 Conductor core wire
26 Insulating sheath
30 Terminal component
32 Joint terminal
33 Wire connection portion
34, 37, 43 Wire barrel
35, 38, 44 Insulation barrel
36, 42 Relay conductor connection portion
40 Connector terminal
41 Counterpart connection portion
46 Relay conductor
48 Mounting portion
50 Seal member
52 Seal main body
54 Held portion
56 Through-hole
60, 160, 260 Connector housing
61, 161, 261 Main body component
62 Housing main body
63, 263 Cavity
64 Protruding wall portion
65 Protruding frame portion
66, 266 First fitting portion
66*a* Protruding piece
66*b* Protrusion
66*c*, 66*d* Step portion
67 Hood
68 Vehicle attachment portion

68*h* Mounting hole
69 Seal member mounting portion
70, 270 First cover component
71, 71*a*, 71*b*, 171, 271 First wall portion
72 Slit
73, 173 First connection wall portion
74, 274 First fitted portion
75, 76, 275 Second fitting portion
175 Fitting portion
75*a*, 76*a* Protrusion
75*b*, 76*b* Retaining piece
80, 280 Second cover component (cover component)
81, 81*a*, 81*b* Second wall portion
82 Second connection wall portion
83 Second fitted portion (fitted portion)
83*a* Groove
83*b* Fitting hole
84 Wire regulating portion
84*a* Guide portion
84*b* Regulating portion
S Seal member

What is claimed is:

1. A connector-equipped wire comprising:

a terminal-equipped wire that includes a coated wire and a terminal component provided at an end portion of the coated wire; and a connector housing that includes a main body component provided with a plurality of cavities so as to be aligned in a plurality of rows and columns, and a cover component mounted to the main body component, wherein a leading end portion of the terminal component is accommodated in the corresponding cavity, a rear end portion of the terminal component protrudes outward of the cavity and is covered by the cover component or the main body component, and the cover component is mountable to the main body component through sliding movement in a direction that intersects a longitudinal direction of the cavity in a state in which the rear end portion of the terminal component protrudes outward of the cavity.

2. The connector-equipped wire according to claim 1, wherein the cover component includes a first cover component and a second cover component that are mountable through sliding movement in directions that intersect each other with respect to the main body component in a state in which the rear end portion of the terminal component inserted into the cavity protrudes outward of the cavity, and the first cover component includes a first wall portion covering a portion of the rear end portion of the terminal component that extends in a circumferential direction thereof, and the second cover component includes a second wall portion covering another portion of the rear end portion of the terminal component that extends in the circumferential direction.

3. The connector-equipped wire according to claim 1, wherein the main body component includes a first wall portion that is formed on an end surface provided with one opening portion of the cavity and that covers another portion of the rear end portion of the terminal component that extends in the circumferential direction, and the cover component includes a second wall portion that covers a portion of the rear end portion of the terminal component that extends in the circumferential direction.

4. The connector-equipped wire according to claim 1, wherein the main body component and the cover component are respectively provided with a fitting portion and a fitted portion for maintaining a mounted state, and the fitting portion is fitted to the fitted portion in the direction of sliding movement of the main body component and the cover component, the direction intersecting the longitudinal direction of the cavity.

5. A connector-equipped wire comprising:

a terminal-equipped wire that includes a coated wire and a terminal component provided at an end portion of the coated wire; and a connector housing that includes a main body component provided with a cavity, and a cover component mounted to the main body component, wherein a leading end portion of the terminal component is accommodated in the cavity, a rear end portion of the terminal component protrudes outward of the cavity and is covered by the cover component or the main body component, and the cover component is mountable to the main body component through sliding movement in a direction that intersects a longitudinal direction of the cavity in a state in which the rear end portion of the terminal component protrudes outward of the cavity, the terminal-equipped wire further includes a seal member mounted to an intermediate portion of the terminal component, the seal member is disposed in the cavity, and a rear end portion of the terminal component, which is located rearward of a portion where the seal member is mounted, protrudes outward from the cavity.

6. The connector-equipped wire according to claim 5, wherein a portion of the cavity where the seal member is disposed has a circular transverse cross-sectional shape, and the rear end portion of the terminal component is covered by four wall portions, and the four wall portions are combined together to form a rectangular tubular shape.

7. A connector housing in which terminal-equipped wires whose end portions are provided with terminal components are to be accommodated, the connector housing comprising:

a main body component provided with a plurality of cavities into which leading end portions of the terminal components are respectively insertable, so as to be aligned in a plurality of rows and columns; and a cover component mounted to the main body component, wherein a rear end portion of each terminal component protrudes outward of the cavity and is covered by the cover component or the main body component, and the cover component is mountable to the main body component through sliding movement in a direction that intersects a longitudinal direction of the cavity in a state in which the rear end portion of the terminal component protrudes outward of the cavity.

8. The connector-equipped wire according to claim 5, wherein the terminal component includes a joint terminal that is connected to the wire, a connector terminal that is to be connected to a counterpart connector terminal, and a relay conductor for connecting the joint terminal and the connector terminal, the connector terminal includes a counterpart connection portion that is to be connected to the counterpart connector terminal, and a relay conductor connection portion that is connected to the relay conductor, and a portion of the relay conductor that extends from the relay conductor connection portion is provided with a seal portion of the seal member.

9. A connector-equipped wire comprising:

a terminal-equipped wire that includes a coated wire and a terminal component provided at an end portion of the coated wire; and a connector housing that includes a main body component provided with a cavity, and a cover component mounted to the main body component, wherein a leading end portion of the terminal component is accommodated in the cavity, a rear end portion of the terminal component protrudes outward of the cavity and is covered by the cover component or the main body component, the cover component is mountable to the main body component through sliding movement in a direction that intersects a longitudinal direction of the cavity in a state in which the rear end portion of the terminal component protrudes outward of the cavity, the connector housing includes a plurality of first wall portions and a plurality of second wall portions that cover the rear end portion of the terminal component from directions that are different from each other, the plurality of first wall portions are provided on the main body component or the cover component, the plurality of second wall portions are provided on the cover component, the plurality of first wall portions are each provided with a slit at a lateral position between adjacent cavities, and the plurality of second wall portions are capable of sliding movement through the slit to a position at which a predetermined terminal is covered in a state in which the plurality of first wall portions cover the rear end portion of the terminal.

* * * * *